(12) United States Patent
Nowik et al.

(10) Patent No.: US 8,501,063 B2
(45) Date of Patent: Aug. 6, 2013

(54) PROCESS OF GRAINING THERMOPLASTIC SHEETS

(75) Inventors: Steve J. Nowik, Ray, MI (US); Edgar Nimmergut, White Lake, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 127 days.

(21) Appl. No.: 12/763,548

(22) Filed: Apr. 20, 2010

(65) Prior Publication Data
US 2011/0254206 A1 Oct. 20, 2011

(51) Int. Cl.
*B29C 39/00* (2006.01)

(52) U.S. Cl.
USPC ........... 264/46.8; 264/134; 264/162; 264/510

(58) Field of Classification Search
USPC ................... 264/134, 162, 510, 46.8
See application file for complete search history.

(56) References Cited

U.S. PATENT DOCUMENTS

| 3,399,101 | A | * | 8/1968 | Magid | 428/159 |
|---|---|---|---|---|---|
| 4,714,424 | A | | 12/1987 | Kinugasa et al. | |
| 4,781,569 | A | | 11/1988 | Kinugasa et al. | |
| 6,841,105 | B2 | * | 1/2005 | Nehring et al. | 264/46.8 |
| 7,157,041 | B2 | * | 1/2007 | Fitzell, Jr. | 264/553 |
| 2003/0067100 | A1 | | 4/2003 | Kato et al. | |
| 2005/0186396 | A1 | * | 8/2005 | Okajima et al. | 428/167 |
| 2005/0212181 | A1 | * | 9/2005 | Evans et al. | 264/485 |
| 2007/0135569 | A1 | * | 6/2007 | DeRudder | 525/67 |
| 2010/0104828 | A1 | * | 4/2010 | Engel et al. | 428/195.1 |
| 2011/0254206 | A1 | * | 10/2011 | Nowik et al. | 264/510 |

OTHER PUBLICATIONS

FRIMO Plastics Technologies in Motion, IMG-Technology, 6 pages, Jan. 2008.

* cited by examiner

*Primary Examiner* — Yogendra Gupta
*Assistant Examiner* — Amjad Abraham
(74) *Attorney, Agent, or Firm* — Reising Ethington P.C.

(57) ABSTRACT

A method of providing a coated and grained surface to a thermoplastic sheet for a vehicle interior panel. One step includes imparting a first grain to a show surface of a thermoplastic sheet. Another step includes applying a coating to a portion or more of the show surface. And another step includes imparting a second grain to the coated portion by bringing the coated portion into direct contact with a graining surface of a tool of a thermoforming machine.

4 Claims, 2 Drawing Sheets

50 — Imparting a First Grain via a First Roller

52 — Applying a Coating via a Second Roller

54 — Imparting a Second Grain via a Tool Graining Surface

PROCESS OF GRAINING THERMOPLASTIC SHEETS

TECHNICAL FIELD

The present invention relates generally to forming thermoplastic sheets for vehicle interior panels, and more particularly to graining surfaces of thermoplastic sheets.

BACKGROUND OF THE INVENTION

Vehicle interior panels, such as door panels, dashboard panels, and headliner panels, are often formed out of a thermoplastic sheet. A show surface of the thermoplastic sheet (i.e., the exposed surface of the eventual panel that can be observed by a vehicle occupant) is sometimes grained and tipped to enhance the appearance of the surface, and in some cases to furnish surface qualities like softness and matte. In a known process, a coating is applied to the show surface of the thermoplastic sheet and to raised portions of pre-grained individual granules (a so-called tipping process). The coating can be a gloss, paint, or other material.

In some known applications, the now grained and coated thermoplastic sheet is formed to its product shape by a thermoforming process using a positive or male tool. The thermoplastic sheet is heated and brought into direct contact with an ungrained outer surface of the positive tool. In some cases, the details of the grain are lost, or washed out of the thermoplastic sheet, by the heating and stretching involved in the thermoforming process with the positive tool, and what are left are grains more elongated and more rounded than desired. Also, the stretching caused by the positive tool—especially stretching at sharper radii features and edges—can cause the previously imparted grains to elongate and become distorted.

Negative graining of a pre-textured panel is also known. U.S. Pat. No. 6,841,105 to Nehring et al. discloses texturing thermoplastic panels on a surface thereof, and disposing the pre-textured surface against a textured mold surface.

SUMMARY OF THE INVENTION

One aspect of the invention is directed to a method of providing a coated and grained surface to a thermoplastic sheet for a vehicle interior panel. The method includes the steps of imparting a first grain to a show surface of a thermoplastic sheet, applying a coating to at least a portion of the show surface, and imparting a second grain to the thermoplastic sheet by bringing at least the coated portion of the show surface into direct contact with a graining surface of a tool of a thermoforming machine.

Another aspect of the invention is directed to a method of vacuum thermoforming a thermoplastic sheet for a vehicle interior panel. The method includes the step of drawing a show surface of a thermoplastic sheet into direct contact with a graining surface of a tool of a vacuum thermoforming machine by applying a partial vacuum. The show surface has a first grain thereon before being drawn against the graining surface, and has a coating located on raised portions of the first grain before being drawn against the graining surface of the tool. The graining surface imparting a second grain directly to the coated show surface of the thermoplastic sheet, over top of the first grain and over top of the coating.

Another aspect of the invention is directed to a method of providing a coated and grained surface to a thermoplastic sheet for a vehicle interior panel. The method includes the steps of imparting a first grain via a first roller to a show surface of a thermoplastic sheet, applying a coating to at least a portion of the show surface via a second roller, and imparting a second grain to the coated portion of the show surface, over the first grain, and over the coating by drawing at least the coated portion of the show surface into direct contact with a graining surface of a tool of a vacuum thermoforming machine.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
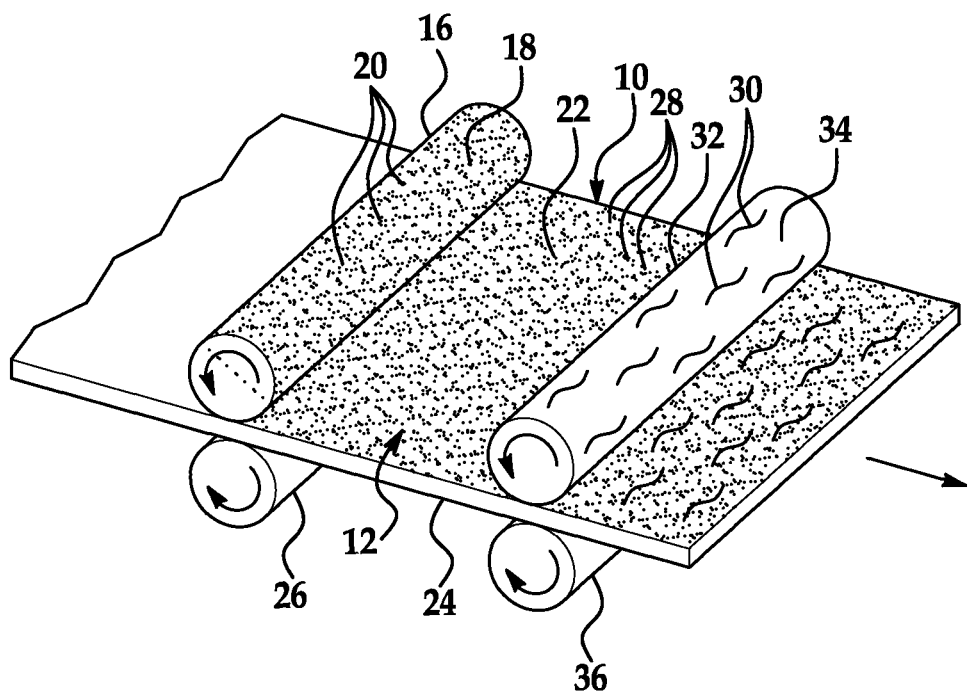
FIG. 1 is a diagrammatic view of an exemplary embodiment of a sequential rolling process used to grain and coat an outer surface of a thermoplastic sheet.

Referring to the drawings, the figures together show an exemplary embodiment of a graining and coating process which can produce a resulting show surface on a thermoplastic sheet 10 with finely detailed grains located on sharp radii features such as faux seam lines, edges, logos, and lettering, and with minimal or no grain wash-out. The resulting show surface is grained and coated to have an enhanced appearance that mimics leather, wood, and other material and patterns, that furnishes surface qualities like softness, depth, matte, age, distress, and the like, or a combination thereof.

Thermoplastic sheets, or skins, subject to the exemplary process are often composed of a thermoplastic polyolefin (TPO) material, an acrylonitrile-butadiene-styrene (ABS) material, a polypropylene material, a polyethylene material, a thermoplastic urethane (TPU) material, or another suitable material. The thermoplastic sheets can be used to manufacture vehicle interior panels such as door panels, dashboard panels, and headliner panels for cars, trucks, boats, and the like. The thermoplastic sheets can be backed by a foam or another material. And depending on the application, the thermoplastic sheets can be contoured in various shapes to a preformed product, can have voids for windows controls and other human-machine-interfaces and electronics, and can include a separate and distinct insert or another structure.

The exemplary process illustrated in the drawings includes the general steps of providing a first grain 12, coating the first grain, and then providing a second grain. FIG. 1 shows a known process of pre-graining and coating. The first grain 12 is imparted or transferred to a portion or more of the otherwise ungrained and uncoated thermoplastic sheet 10 by way of a first roller 16 (also called a calendar roll). The first roller 16 has a first graining surface 18 with multiple individual granules 20 which are forcibly rolled directly against a show surface 22 of the thermoplastic sheet 10. The show, or outer, surface 22 is that which will be observed by a vehicle occupant when the thermoplastic sheet 10 is in final panel form, while a back surface 24 is not exposed to the vehicle occupant and therefore is not grained or coated. The first roller 16 can be a driving (active) or driven (passive) roller. Another roller 26 can be provided without a graining surface and instead can be used to guide or drive the thermoplastic sheet 10. The first grain 12 has individual granules 28 shaped and sized to receive coating during the coating process. The individual granules 28 create raised and depressed (unraised) portions in the show surface 22. Of course other rollers or other means of imparting the first grain 12 can be used instead of, or in addition to, the illustrated first roller 16.

Still referring to FIG. 1, raised portions of the individual granules 28 are then coated, or tipped, with a coating material 30 by way of a second roller 32 (also called an ink roller). The second roller 32 has a coating surface 34 which carries the coating material 30 and directly contacts and applies the coating material to the raised portions of the show surface 22, while the depressed portions remain uncoated. The second roller 32 can be a driving (active) or driven (passive) roller. Another roller 36 can be provided without a coating surface and instead can be used to guide or drive the thermoplastic sheet 10. In a mass production manufacturing environment, the first and second rollers 16, 32 can be part of, and can constitute, a sequential rolling process where the respective processes are performed in immediate order. Or the respective rolling processes can be separate and distinct processes performed at different times and at different locations. Of course other rollers and other components can be used instead of, or in addition to, the components shown and described in order to coat the show surface 22. For example, in another embodiment of the coating process, the coating material can be applied in another way and without the rollers 32, 36 such as by way of a spraying process. Also, either just a portion or the entire sheet can be coated. For example, rather than coating only the raised portions, one or more regions of the surface can be completely or partially coated while other areas are not.

Figure 2:
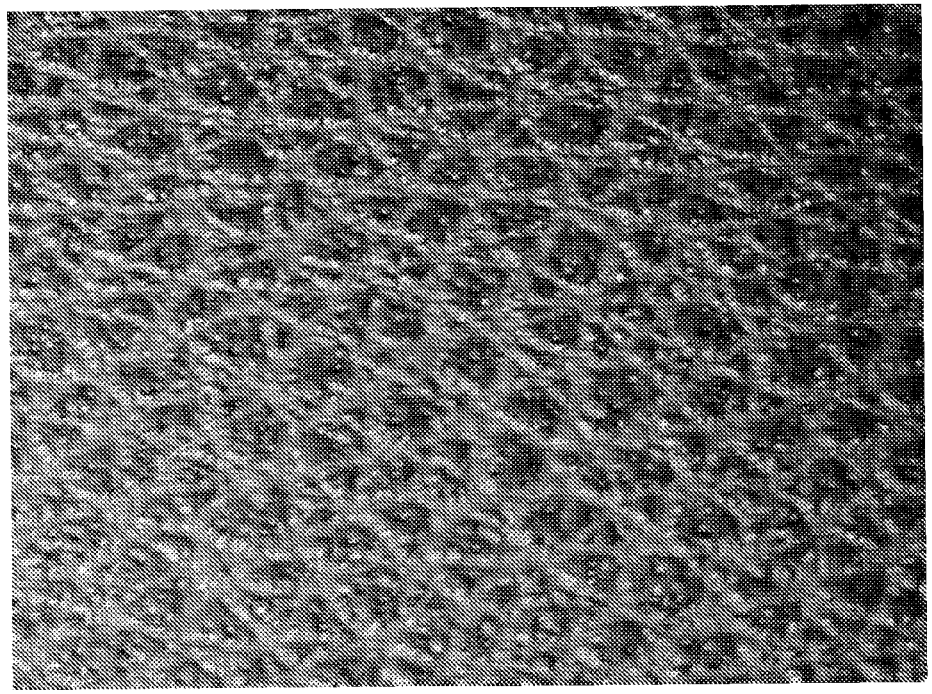
FIG. 2 is a magnified and enlarged view of a pre-grained and coated outer surface of the thermoplastic sheet of FIG. 1.

The coating material 30 can be a material which enhances or diminishes the gloss properties of the raised portions of the show surface 22, which provides a different color to the raised portions as compared to the depressed portions, or which influences appearance properties of the raised portions in another way. For example, the coating material 30 can create a dual gloss, dual color, hue effect, or a combination thereof on the show surface 22. FIG. 2 shows the resulting grained and coated individual granules 28 created by the known process of FIG. 1. The nonuniform raised portions are shown darker than the depressed portions; of course, different patterns and constructions of grained and coated individual granules can be created by the process of FIG. 1.

Figure 3:
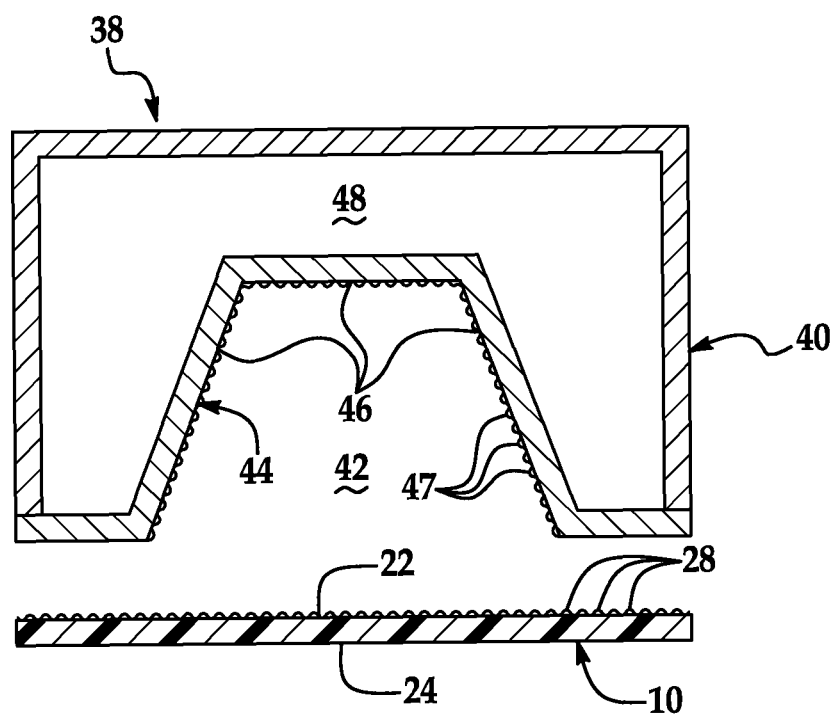
FIG. 3 is a diagrammatic view of an exemplary embodiment of a thermoforming process which puts grains on the outer surface of the grained and coated thermoplastic sheet of FIG. 1.

After the coating material 30 is dry or at least substantially dry, the second grain is imparted or transferred to the show surface 22 by a so-called negative graining process. Referring to FIG. 3, a vacuum thermoforming machine 38 includes a mold 40 with a thermoforming tool 44 which can be a separate and removable component or can be a one-piece structure. The tool 44 is shaped with a female cavity 42 and has a graining surface 46 directly confronting the show surface 22 of the thermoplastic sheet 10 and having multiple individual granules 47 which are forcibly pressed directly against the show surface. The graining surface 46 has multiple minute vacuum passages (not shown) extending therethrough and communicating with a vacuum chamber 48 of the vacuum thermoforming machine 38. The graining surface 46 can have one or more protruding structures (not shown) which form a corresponding recess in the thermoplastic sheet 10; likewise, the graining surface can have one or more recessed structures (not shown) which form a corresponding protruding structure in the thermoplastic sheet. The vacuum thermoforming machine 38 can have different components, constructions, and arrangements than that shown by the diagrammatic exemplary representation of FIG. 3.

The second grain can have individual granules that have different constructions and patterns than the individual granules 28 of the first grain 12. For example, the individual granules of the second grain can be dimensioned with finer details and can be located along sharper radii features and edges (e.g., concave and convex features) of the thermoplastic sheet 10 as compared to the individual granules 28. The individual granules of the second grain can be located on and used to produce faux seam lines, edges, logos, lettering, and the like. On average, individual granules of the second grain can have finer details such as micro-textures and micro-stippling than is obtained by conventional processes that involve stretching of the first grain during the thermoforming using an ungrained positive tool. And in general, a majority of the individual granules of the second grain can have finer details than a majority of the individual granules 28 of the first grain 12. In other embodiments, individual granules of the second grain need not have the finer details and need not be located along sharper radii features and edges of the thermoplastic sheet 10, and instead can resemble the individual granules 28.

In the exemplary process illustrated in the drawings, individual granules of the second grain can have different constructions and patterns than those produced by a thermoforming process with an ungrained positive tool. For example, the individual granules of the second grain can be dimensioned and configured with finer details and can be located along sharper radii features and edges as compared to individual granules produced by the ungrained positive tool process. In one example where the show surface 22 is bent at an angle of 90° or greater, as is common in vehicle panels, a resulting radius of an edge with individual granules of the second grain found at the bend is approximately greater than or equal to 0.8 mm and less than 2.0 mm. Edges produced by the prior art ungrained positive tool process, in contrast, typically have a resulting radius at a bend of 90° or greater of approximately greater than 2.0 mm. In some cases, the bend does not even have visible individual granules because the granules have been elongated.

Still referring to FIG. 3, in an exemplary vacuum thermoforming process, after imparting the first grain 12 and applying the coating material 30, the thermoplastic sheet 10 is fixtured and placed between the mold 40 and an opposing mold (not shown) of the vacuum thermoforming machine 38. In this position, the show surface 22 directly faces and directly confronts the graining surface 46 and the individual granules 47. The opposing molds are then brought together and closed upon the thermoplastic sheet 10. The associated partial vacuum is initiated and the thermoplastic sheet 10 is suctioned and drawn into direct contact with the tool 44. The show surface 22 is forced against the graining surface 46, and the individual granules 47 impart the second grain directly over and on top of the first grain 12, and directly over and on top of the coating material 30. The thermoplastic sheet 10 can then be cooled or allowed to harden to produce the preformed product. The preform can then be removed, trimmed, backed with foam, or subsequently processed in another way.

Figure 4:
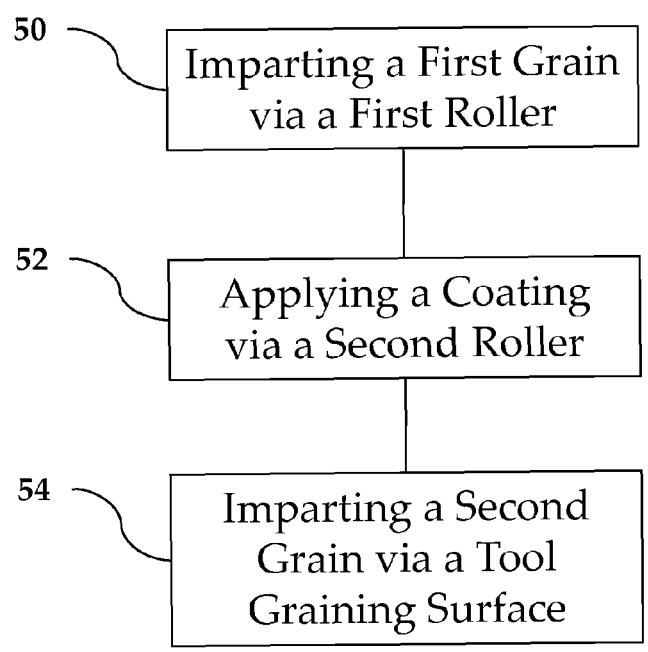
FIG. 4 is a flowchart outlining an exemplary method of a graining and coating process.

FIG. 4 is a flowchart outlining some of the general steps of the exemplary graining and coating process described above. At a step 50, the first grain 12 is imparted to the thermoplastic sheet 10 by way of the first roller 16. Then, at a step 52, the coating material 30 is applied by way of the second roller 32. And finally, at a step 54, the second grain is imparted by way of the graining surface 46.

In different embodiments, the exemplary process need not be performed in the order described, may differ in one or more particular steps, may have additional steps than those shown and described, and may not necessarily include every step that is shown and described. For example, the first grain could be imparted to the thermoplastic sheet by way of a plate that is forced against an outer surface of the thermoplastic sheet; the thermoforming process could be a pressure thermoforming process instead of a vacuum thermoforming process; there could be a cutting process before or after the first grains are imparted, after the coating is applied, or at another time; there could be heating and cooling processes performed to the thermoplastic sheet at different times in the process; the thermoforming machine could be equipped with plug assist capabilities; and the thermoplastic sheet could be supplied as stock with the first grain and the coating material already provided to the thermoplastic sheet (pre-grained and pre-coated)—in other words, the process steps of imparting the first grain and applying the coating material can be performed at different times and by different entities.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of providing a coated and grained surface to a thermoplastic sheet for a vehicle interior panel, the method comprising the steps of: imparting a grain to a show surface of an unformed thermoplastic sheet, the grain including individual granules that create raised and depressed portions in the show surface; applying a coating to at least some of the raised portions of the show surface, wherein the depressed portions of the show surface remain generally uncoated; and drawing at least the coated portion of the show surface into direct contact with a graining surface of a tool of a vacuum thermoforming machine, wherein the surface of the tool includes one or more protruding structures or recessed structures or both so that each protruding or recessed structure forms a respective recess or protrusion in the thermoplastic sheet, and at least one of the formed recesses or protrusions includes a radius at the show surface that is greater than or equal to 0.8 mm and less than about 2.0 mm; and wherein the drawn thermoplastic sheet includes at least one feature at the show surface, wherein the at least one feature includes a faux seam line, a logo, lettering, or any combination thereof; and wherein the radius is along an edge of the at least one feature.

2. The method of claim 1, wherein the grain is imparted to the show surface via a first roller and the coating is applied to the raised portions of show surface via a second roller in a sequential rolling process.

3. The method of claim 2, wherein the coating influences the gloss properties of the raised portions, provides a different color to the raised portions as compared to the depressed portions, or both.

4. The method of claim 1, wherein the edge is along a bend at the show surface and the bend is greater than 90 degrees.

\* \* \* \* \*